United States Patent
Mermoud et al.

(10) Patent No.: US 11,290,331 B2
(45) Date of Patent: Mar. 29, 2022

(54) DETECTION AND RESOLUTION OF RULE CONFLICTS IN DEVICE CLASSIFICATION SYSTEMS

(71) Applicant: Cisco Technology, Inc., San Jose, CA (US)

(72) Inventors: Grégory Mermoud, Veyras VS (CH); Jean-Philippe Vasseur, Saint Martin d'uriage (FR); Pierre-Andre Savalle, Rueil-Malmaison (FR); David Tedaldi, Zurich (CH)

(73) Assignee: Cisco Technology, Inc., San Jose, CA (US)

( * ) Notice: Subject to any disclaimer, the term of this patent is extended or adjusted under 35 U.S.C. 154(b) by 328 days.

(21) Appl. No.: 16/428,202

(22) Filed: May 31, 2019

(65) Prior Publication Data
US 2020/0382373 A1    Dec. 3, 2020

(51) Int. Cl.
| | | |
|---|---|---|
| *H04L 12/24* | (2006.01) | |
| *H04L 29/06* | (2006.01) | |
| *H04L 12/723* | (2013.01) | |
| *H04L 41/0873* | (2022.01) | |
| *H04L 45/50* | (2022.01) | |
| *H04L 41/0893* | (2022.01) | |
| *H04L 41/0816* | (2022.01) | |

(52) U.S. Cl.
CPC ...... *H04L 41/0873* (2013.01); *H04L 41/0816* (2013.01); *H04L 41/0893* (2013.01); *H04L 45/507* (2013.01); *H04L 63/0263* (2013.01)

(58) Field of Classification Search
CPC .......... H04L 41/0873; H04L 41/0816; H04L 41/0893; H04L 45/507; H04L 63/0263
See application file for complete search history.

(56) References Cited

U.S. PATENT DOCUMENTS

| | | | |
|---|---|---|---|
| 7,441,022 B1 | 10/2008 | Schuba et al. | |
| 7,505,463 B2 | 3/2009 | Schuba et al. | |
| 8,654,763 B2 | 2/2014 | Liu et al. | |
| 2008/0126286 A1* | 5/2008 | Machani ................. | G06F 21/57 706/47 |

(Continued)

OTHER PUBLICATIONS

U.S. Appl. No. 16/194,442, filed Nov. 19, 2018, Mermoud et al.

(Continued)

*Primary Examiner* — Abdulkader M Alriyashi
(74) *Attorney, Agent, or Firm* — Behmke Innovation Group LLC; Kenneth J. Heywood; James J. Wong

(57) ABSTRACT

In one embodiment, a service receives a plurality of device type classification rules, each rule comprising a device type label and one or more device attributes used as criteria for application of the label to a device in a network. The service estimates, across a space of the device attributes, device densities of devices having device attributes at different points in that space. The service uses the estimated device densities to identify two or more of the device type classification rules as having overlapping device attributes. The service determines that the two or more device type classification rules are in conflict, based on the two or more rules having different device type labels. The service generates a rule conflict resolution that comprises one of the device type labels from the conflicting two or more device type classification rules.

20 Claims, 8 Drawing Sheets

(56) References Cited

U.S. PATENT DOCUMENTS

2014/0249875 A1     9/2014   Junker et al.
2018/0278486 A1     9/2018   Mermoud et al.
2019/0306731 A1*   10/2019   Raghuramu .......... H04W 48/16

OTHER PUBLICATIONS

U.S. Appl. No. 16/194,666, filed Nov. 19, 2018, Vasseur et al..
Crammer, et al., "Online Passive-Aggressive Algorithms", Journal of Machine Learning Research, vol. 7, Mar. 2006, pp. 551-585.
Hamed, et al., "Taxonomy of Conflicts in Network Security Policies", IEEE Communications Magazine, vol. 44, Issue 6, Mar. 20, 2006, pp. 134-141, IEEE.
Hu, et al., "Detecting and Resolving Firewall Policy Anomalies", IEEE Transactions on dependable and Secure Computing, vol. 9, No. 3, May/Jun. 2012, pp. 318-331, IEEE.
Lindgren, Tony, "Methods for Rule Conflict Resolution", In: Boulicaut JF., Esposito F., Giannetti F., Pedreschi D. (eds) Machine Learning: ECML 2004. ECML 2004. Lecture Notes in Computer Science, vol. 3201, 2004, pp. 262-273, Springer, Berlin, Heidelberg.

\* cited by examiner

DETECTION AND RESOLUTION OF RULE CONFLICTS IN DEVICE CLASSIFICATION SYSTEMS

TECHNICAL FIELD

The present disclosure relates generally to computer networks, and, more particularly, to the detection and resolution of rule conflicts in device classification systems.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular device is known to the network. For example, the network may limit a particular type of sensor to only communicating with its supervisory device. Typically, this classification is made by observing the behavior of the device during a short period of time after joining the network (e.g., the first minute) and applying a device classification rule to the observed behavior. However, this also leads to the very real possibility of the system having classification rules that conflict, with one rule indicating that a device is of a first type and another, equally valid rule, indicating that the device is of a second type.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
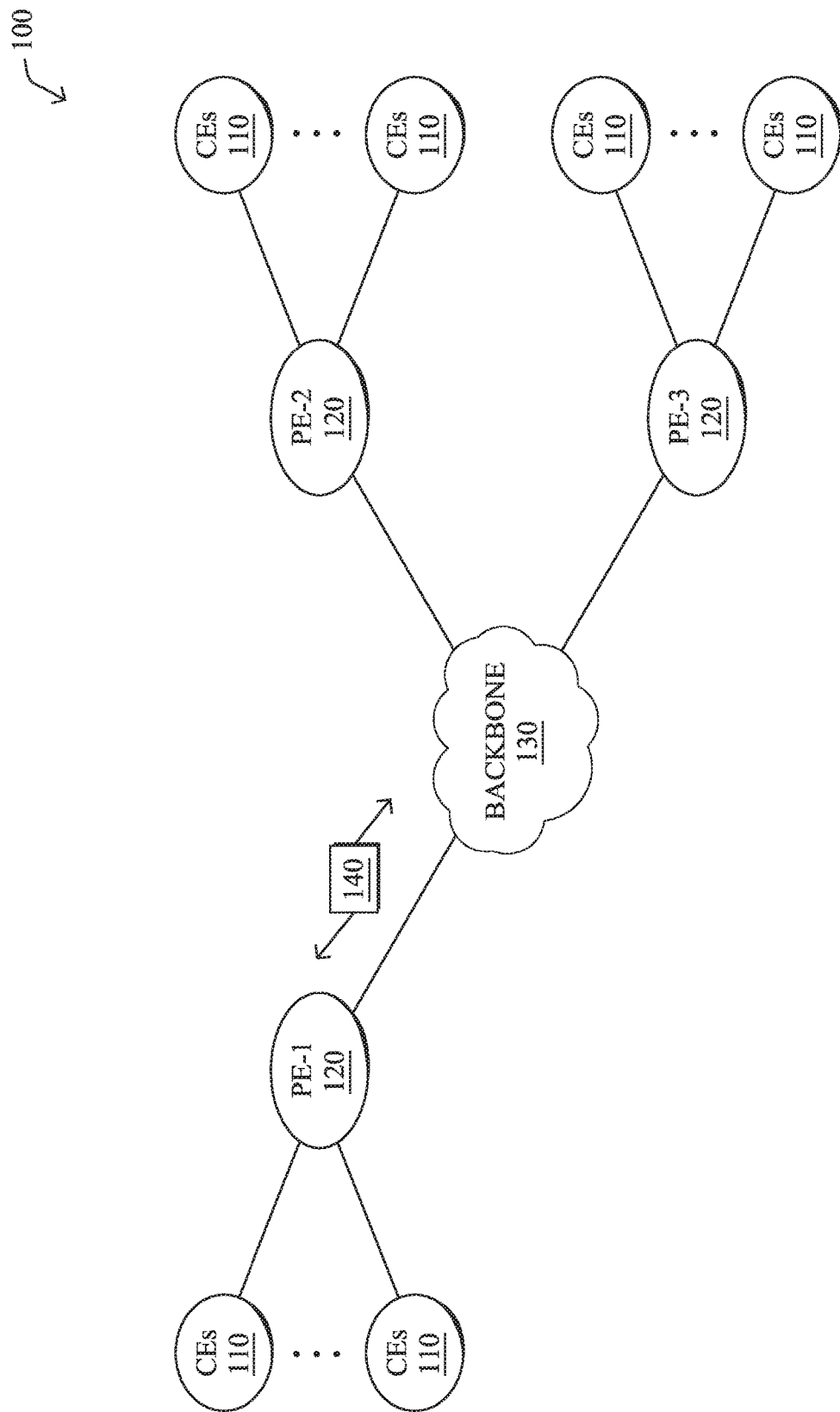
FIGS. 1A-1B illustrate an example communication network.

According to one or more embodiments of the disclosure, a service receives a plurality of device type classification rules, each rule comprising a device type label and one or more device attributes used as criteria for application of the label to a device in a network. The service estimates, across a space of the device attributes, device densities of devices having device attributes at different points in that space. The service uses the estimated device densities to identify two or more of the device type classification rules as having overlapping device attributes. The service determines that the two or more device type classification rules are in conflict, based on the two or more rules having different device type labels. The service generates a rule conflict resolution that comprises one of the device type labels from the conflicting two or more device type classification rules.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
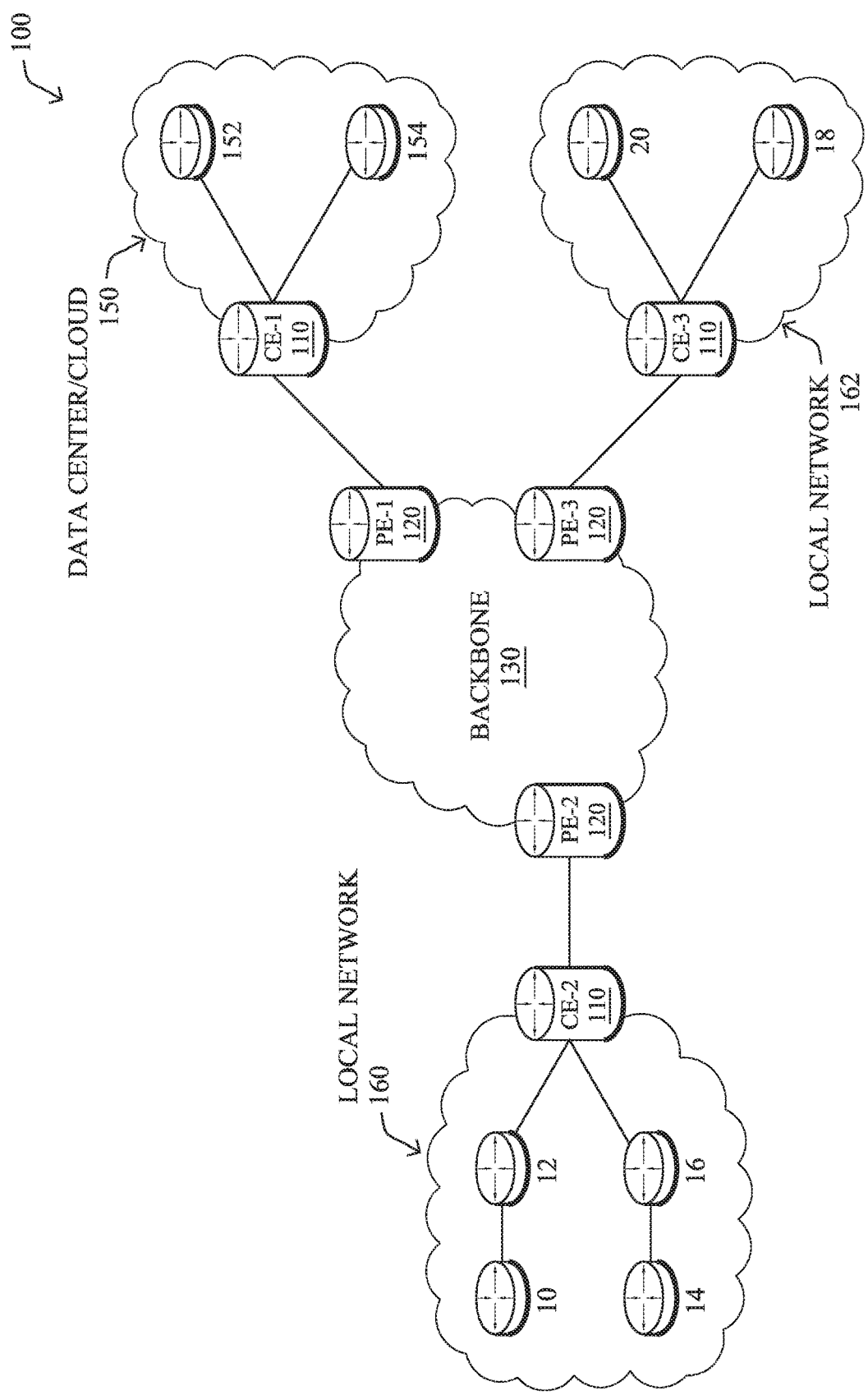

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
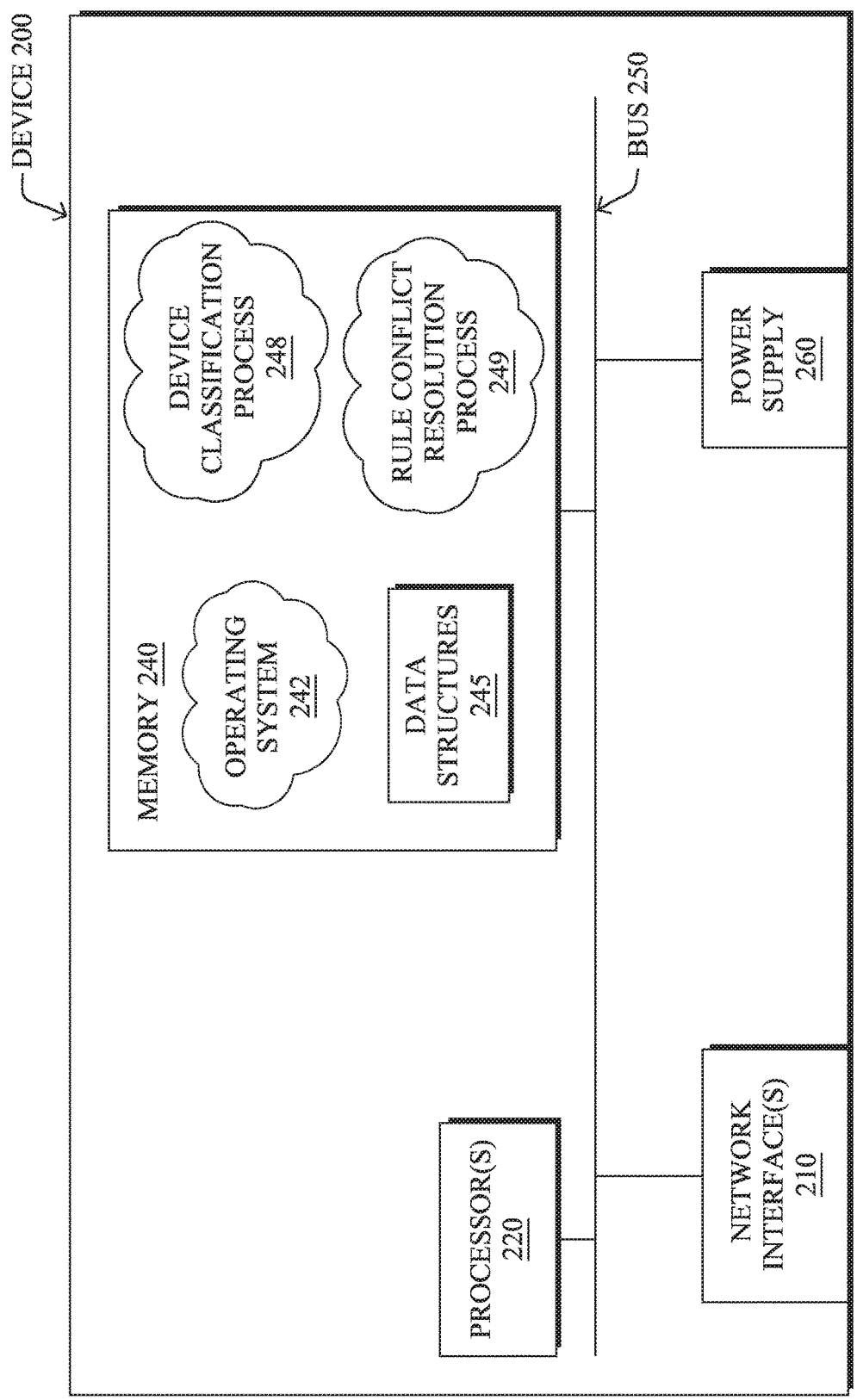
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248 and/or a rule conflict resolution process 249, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
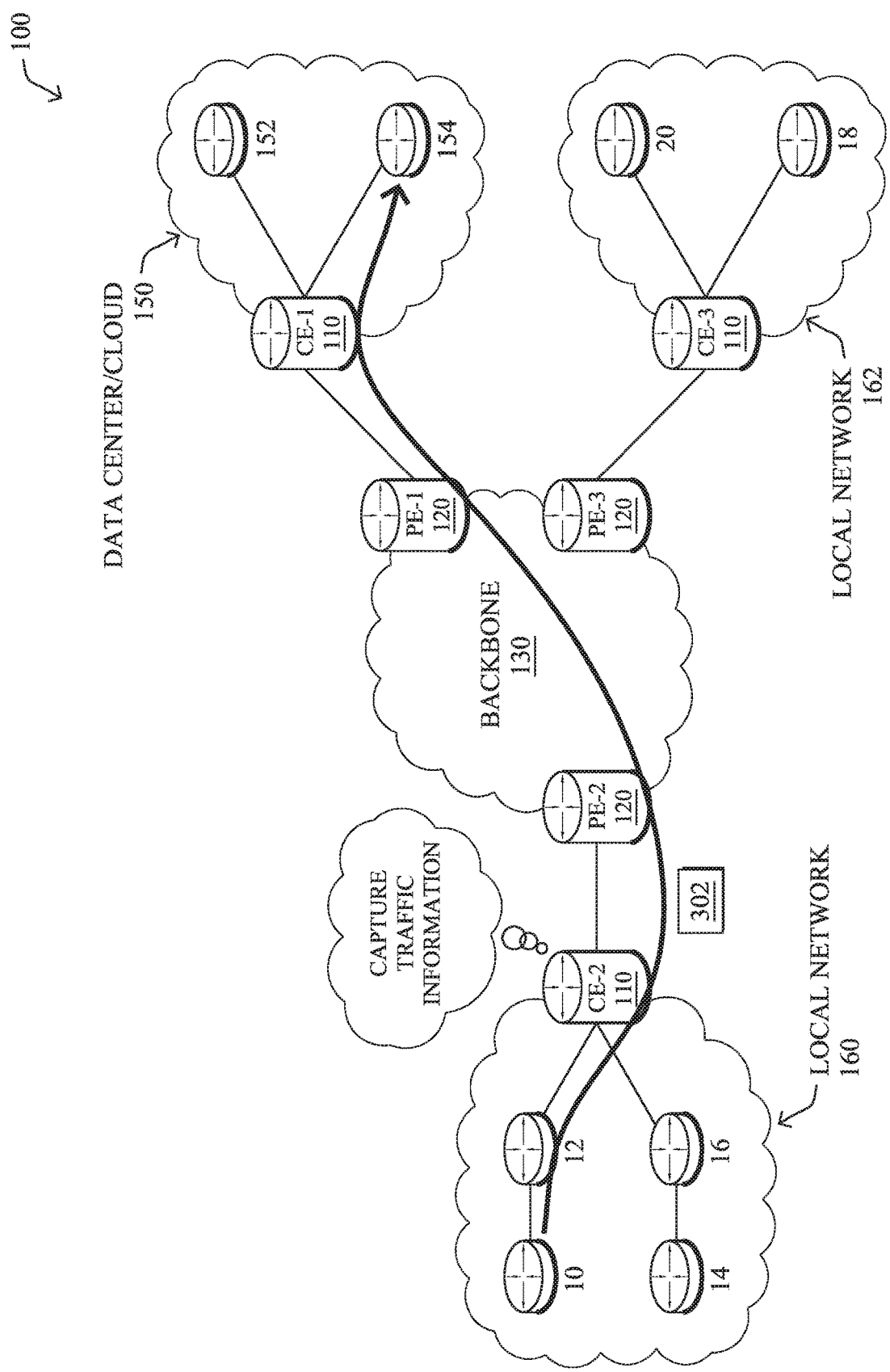
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture telemetry data about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example features in the captured telemetry data may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

Figure 4:
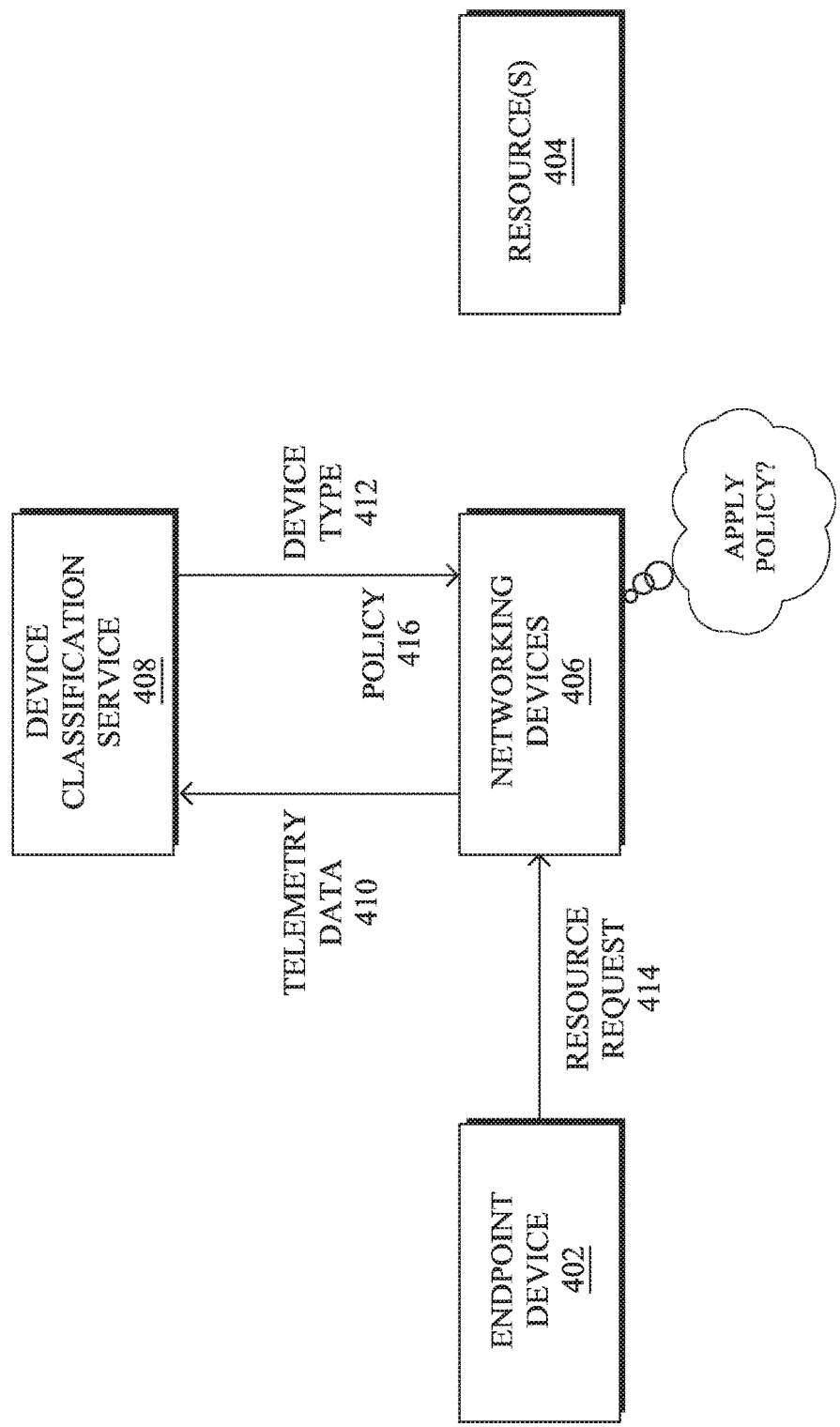
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also as shown in FIG. 4 is a device classification service 408 that may be hosted on one or more of networking devices 406 or be in communication therewith. Service 408 may, for example, be provided through the execution of device classification process 248 and/or rule conflict resolution process 249, described above. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model/version (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy 416 associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:

DHCP probes with helper addresses

SPAN probes, to get messages in INIT-REBOOT and SELECTING states, use of ARP cache for IP/MAC binding, etc.

Netflow probes

HTTP probes to obtain information such as the OS of the device, Web browser information, etc.

RADIUS probes

SNMP to retrieve MIB object or receives traps

DNS probes to get the Fully Qualified Domain Name (FQDN)

etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

As noted above, a typical device classification system uses static rules, which may come from a plurality of sources (e.g., vendors, users, experts, etc.), to classify the type of a device on a network. Unfortunately, these sources are not coordinated in any way and many rules have been found to overlap, at best, or conflict, at worst. Thus, a given device may match multiple classification rules that may or may not lead to the same device type classification. Furthermore, the sources of the rules can vary greatly in terms of their reliability. For instance, a given ruleset may be very accurate for medical devices but not accurate at all for consumer devices. Similarly, a given user might be an expert in enterprise devices, only, but may also provide labels for any type of device.

In principle, checking whether two rules are conflicting may appear straightforward. For instance the rules (attr="A" OR attr="B") and (attr="A" OR other-attr="C") are easily seen to both yield true when attr is "A." However, the challenge in practice is more involved. For example, (attr="B") and (other-attr="C") may be conflicting, in practice, if attr is "B" if and only if other-attr is "C." More generally, there may be empirical conflicts where rules involving different attributes and conditions still end up always or frequently matching the same devices.

The use of structured labels (e.g., {manufacturer, hardware, software}) makes the problem of resolving rule conflicts even more acute, as rules assigning different labels and seemingly conflicting based on the empirical data may turn out to correspond to different levels of granularity in the description of a single device type. Note also that the device classification rules may also be generated on the fly via active labeling, as described below, leading to potentially many rules coming from a variety of users, thereby increasing the chances of rule conflicts.

Detection and Resolution of Rule Conflicts in Device Classification Systems

The techniques herein introduce a series of mechanisms to detect and resolve empirical conflicts between device classification rules in a way that make the resulting ruleset more consistent, accurate, and effective. The techniques are further able to handle structured/hierarchical device labels, as well as to detect and resolve empirical conflicts even between seemingly unrelated rules that do not involve any common attribute or clause.

Specifically, a service receives a plurality of device type classification rules, each rule comprising a device type label and one or more device attributes used as criteria for application of the label to a device in a network. The service estimates, across a space of the device attributes, device densities of devices having device attributes at different points in that space. The service uses the estimated device densities to identify two or more of the device type classification rules as having overlapping device attributes. The service determines that the two or more device type classification rules are in conflict, based on the two or more rules having different device type labels. The service generates a rule conflict resolution that comprises one of the device type labels from the conflicting two or more device type classification rules.

Illustratively, the techniques described herein may be performed by hardware, software, and/or firmware, such as in accordance with the device classification process 248 and the rule conflicts resolution process 249, which may include computer executable instructions executed by the processor 220 (or independent processor of interfaces 210) to perform functions relating to the techniques described herein.

Figure 5:
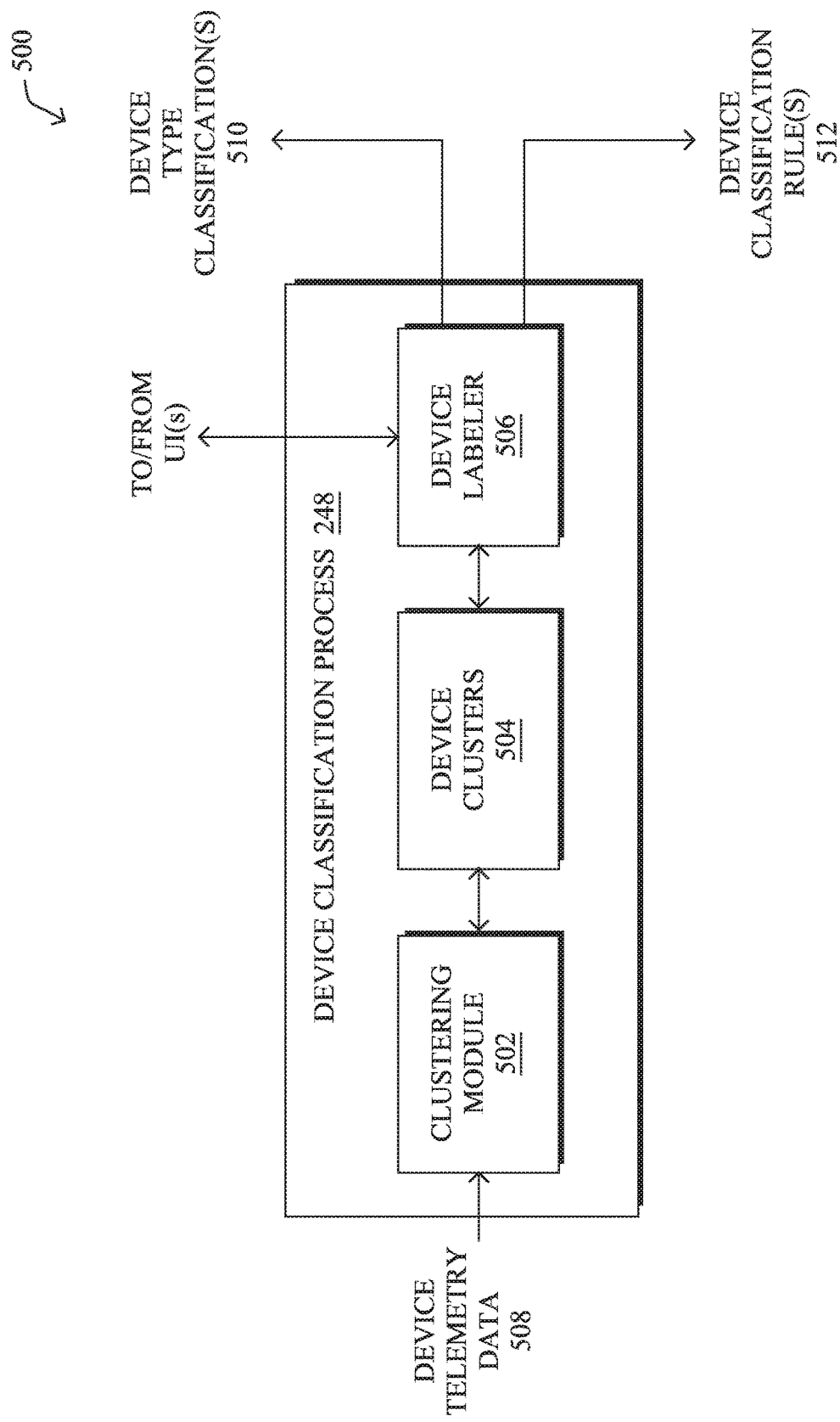
FIG. 5 illustrates an example architecture for a device classification process.

Operationally, FIG. 5 illustrates an example architecture 500 for device classification process 248, according to various embodiments. As shown, device classification process 248 may include any or all of the following components: clustering module 502, device clusters 504, and/or a device labeler 506, to provide a device classification service to one or more networks. These components 502-506 may be implemented in a distributed manner or implemented on a single device. In addition, some or all of components 502-506 may be implemented as part of a monitored network (e.g., at the network edge) or part of a cloud-based device classification service. For example, in some implementations, a cloud-based device classification service may perform centralized rule generation for any number of networks that perform the classifications locally. The functionalities of the components of architecture 500 may also be combined, omitted, or implemented as part of other processes, as desired.

As shown, device classification process 248 may receive device telemetry data 508 regarding any number of devices undergoing device type classification. Such device telemetry data 508 may include, for example, the MAC addresses of the devices, traffic features captured from the devices' traffic (e.g., which protocols were used, source or destination information, etc.), timing information (e.g., when the devices communicate, sleep, etc.), and/or any other information regarding the devices that can be used to infer their device types. For example, device telemetry data 508 may take the form of a feature vector in which each dimension represents the presence or absence of a certain protocol in the traffic of the device such as, but not limited to, IPv6, IPv4, IGMPv3, IGMPv2, ICMPv6, ICMP, HTTP/XML, HTTP, etc.

In turn, device classification process 248 may output a device type classification 510 for a device under scrutiny, thereby allowing the receiving entity to apply network policies to the device, based on its device type classification 510. For example, one such network policy may cause a networking device to prevent an MRI machine from accessing the Internet or another resource via the network.

In various embodiments, the components 502-506 of device classification process 248 may leverage active learning, to assign device type classifications 510 to the devices under scrutiny. To do so, clustering module 502 may assign the devices under scrutiny to device clusters 504, based on their telemetry data 508. For example, a device cluster 504 may include those devices that exhibit the same or similar traffic or other behavioral features. If a device type is then associated with a device cluster 504, device labeler 506 may apply that type to a device as device type classification 510. In cases in which device labeler 506 is unable to classify the cluster 504 with sufficient confidence, it may send a label request to a user interface (UI), seeking active labeling of that cluster. In other words, device classification process 248 may be configured to leverage active learning, to learn the labels of unknown devices over time. Note also that the pool of device telemetry data 508 may be from any number of networks and that device labeler 506 may seek labels for a device cluster 504 from any number of experts across any number of networks, as well. Once the cluster is labeled by an expert, device labeler 506 can then apply that label to any other devices that fall within that cluster, as well.

More formally, let $D=\{D_1, D_2, \ldots, D_N\}$ denote the set of devices seen on the one or more networks under analysis by device classification process 248, each of which is identified by its MAC address or another unique identifier. For every device $D_i$ at time t, clustering module 502 may construct a feature vector $X_{i,t}$ from the telemetry data 508 for the device. Clustering module 502 may then apply a clustering algorithm, such as DB-scan, k-means, k-medoids, etc., to create a set of device clusters 504. Let $C_t=\{C_{1,t}, \ldots, C_{K,t}\}$ denote these cluster, where $C_{j,t}$ is the $j^{th}$ set of devices clustered together at time t. As would be appreciated, the number of clusters K is typically smaller, or at most equal, to the number of points N, and the collection of clusters C defines a partition of the set of devices D. In doing so, each device represented in a device cluster 504 may exhibit similar behaviors as those of the other devices in its cluster.

Clustering module 502 may perform the device clustering periodically at a relatively high frequency (e.g., hourly) or at a lower frequency (e.g., weekly). Clustering module 502 can also produce subsequent clustering either by performing new clustering from scratch or by leveraging warm-starting techniques whereby $C_{t+1}$ is obtained by running the algorithm on data corresponding to that time point, but using an initialization based on $C_t$. Whether clustering module 502 uses warm-starting can have a large impact on the 'trajectory' of the clustering and is an important design consideration.

In various embodiments, device classification process 248 may also reclassify a device periodically, at a predefined time, or in response to a request to do so. For example, as the device under scrutiny uses the network, additional device telemetry data 508 can be captured. Generally speaking, the more telemetry data regarding the behavior of the device, the greater the accuracy of the resulting device type classification 510. Indeed, there may be slight behavioral differences between devices of different types, leading device classification process 248 to misclassify the device, initially, but correct this misclassification later on in time, as more information about the device becomes available.

According to various embodiments, device labeler 506 may also be configured to generate a device classification rule 512 for a given device cluster 504, based on its associated telemetry data 508 and the device type labels obtained from experts through active learning. For example, device labeler 506 may aggregate the labels obtained from the experts, to form a finalized device type classification label for the device cluster 504, using any number of conditions (e.g., whether a threshold number of the labels agree, the majority of labels, etc.). In turn, device labeler 506 may associate this label with the telemetry data 508 representative of the device cluster 504, such as the centroid of the cluster, etc.

By generating a device classification rule 512, device labeler 506 can then use this rule to quickly assess the telemetry data for new devices on the network(s). In addition, device labeler 506 can also deploy device classification rule 512 to any number of Identity Service Engines (ISEs) and/or device classification services in the network(s), to perform the device classifications locally. This allows every new device appearing on the network and matching device classification rule 512 to be identified with the corresponding device type.

In practice, device classification rules 512 can be specified manually and/or automatically generated by device classification process 248. This leads to the very real possibility of at least some device classification rules 512 conflicting. For example, a manually-defined rule in a network under scrutiny may conflict with another rule that was automatically generated, other manually-defined rules in the network or other networks. etc.

For purposes of illustration, a device classification rule 512 may take the form of a pair (R, L) where R is a logical statement whose free variables are device attributes that specify whether the device type label L should be applied to a given device (e.g., if the attributes of the device satisfy R). Typically, the label L is a structured object of the form {manufacturer, hardware, software}, for instance, {Apple, iPhone 8, iOS 12.1.23}. In practice, R can be thought of as a low-dimensional manifold in the N-dimensional space spawned by all N attributes that a given device can have, such as its organizationally unique identifier (OUI), HTTP user agent, DHCP parameters, application usages, etc. Note that N can grow extremely large, and this low-dimensional manifold may or may not overlap with the low-dimensional manifolds of other rules, but this topological consideration is not really of interest. What matters, in reality, is to detect whether feasible conflicts exist. Indeed, rather than focusing on the detection and resolution of conflicts in principle, the techniques herein focus on detecting empirical conflicts, that is, based on existing data, and resolving them by accounting for the structured nature of the labels and unreliable nature of the rule sources.

Figure 6:
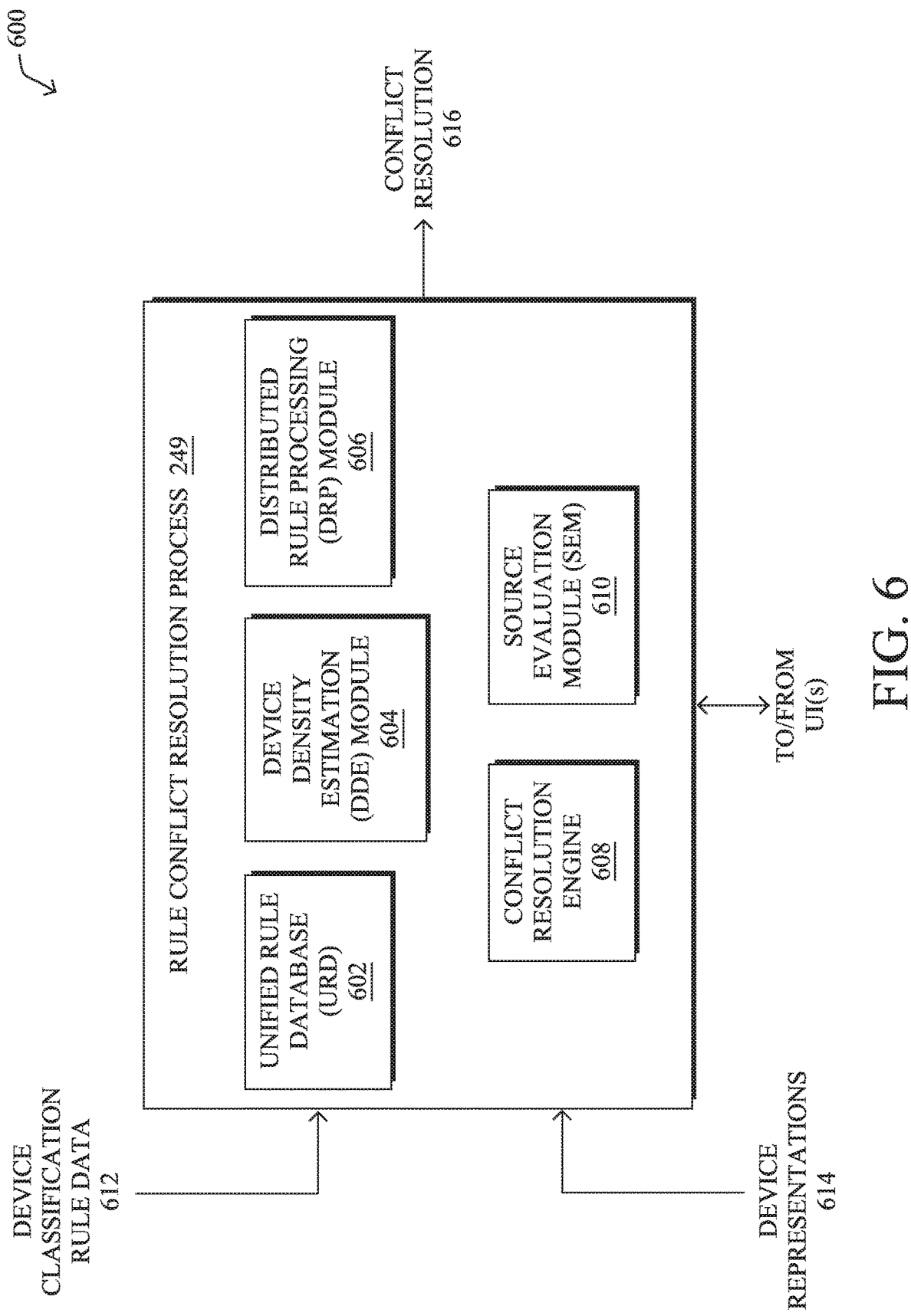
FIG. 6 illustrates an example architecture for a rule conflict resolution process.

Referring now to FIG. 6, an example architecture 600 for rule conflict resolution process 249 is shown, according to various embodiments. In general, rule conflict resolution process 249 may operate in conjunction with any number of instances of device classification process 248, to resolve device classification rule conflicts from among those instances and/or any other network services that use device classification rules. As shown, process 249 may comprise any or all of the following components: a unified rule database (URD) 602, a device density estimation (DDE) module 604, a distributed rule processing (DRP) module 606, a conflict resolution engine 608, and/or a source evaluation module (SEM) 610. These components 602-610 may be implemented in a centralized or distributed manner and their functionalities may be combined or omitted, as desired. In addition, some or all of components 602-610 may be implemented as part of device classification process 248, in further embodiments.

As shown, unified rule database (URD) 602 may receive and store the device classification rules (e.g., rules 512 described above) maintained by any number of device classification services across any number of different networks. Such device classification rule data 612 may be provided to rule conflict resolution process 249 according to the above rule format, as well as associated metadata such as an identifier of the source of the rule, a timestamp of its creation, and/or an optional indicator of confidence assigned by the creator of the rule. Consequently, URD 602 may include potentially hundreds of millions of rules spanning millions of device types. These rules may also originate from various approaches, such as third-party systems, manually created rules, rules created via active labeling, third party software development kits (SDKs) or application programming interfaces (APIs) of device vendors or the like.

An important feature of URD 602 is its extensibility: connectors and collectors for new data sources can be easily added, even though their role remains always the same, that is, consuming classification rules in some arbitrary format and convert them to the universal format supported by URD 602. Additionally, a field in URD 602 may keep track of the origin of the rules (e.g., internal system, user-driven ML rules, . . . ) from device classification rule data 612, in addition to some metrics tracking the number of times the rule was involved in some form of conflict with other rules.

In some embodiments, rule conflict resolution process 249 may also include Device Density Estimation (DDE) module 604, whose role is to build a representation of the manifold of all possible devices in the spaces of attributes. To do so, DDE module 604 may attempt to represent the "density of devices" or, more formally, the probability density of various regions of the N-dimensional space into which devices can be mapped. To this end, DDE module 604 takes as input a stream of device representations 614, denoted $D_i=[a_1, a_2, \ldots, a_N]$, where each a is a device attribute, obtained by process 249 from any number of device classification service instances. This stream of device representations 614 may be down-sampled on-premise, in order to save WAN usage, but it is important that it remains representative of the rate at which different devices are observed. Based on this, DDE module 604 may maintain an internal representation of the density across the whole space by keeping so-called support points that are representative of a specific class of devices, along with a measure of the density at this point and its spread along the N dimensions of this class. This can be achieved using online passive-aggressive algorithms or online kernel density estimation methods, for example. Alternatively, DDE module 604 may use different types of data structures, such as k-dimensional trees (k-d trees), as long as they retain enough information about the device representation. Indeed, hashing or random projection techniques traditionally used to produce core sets for a variety of applications cannot easily be used here as rules cannot be evaluated on the resulting representation.

As a result, the obtained "support devices" from device representations 614 are a compressed set of representatives for all existing devices. Note that it is not necessarily expected that DDE module 604 will find a unique support device per device type from device representations 614. Instead, it is likely that a given type of device corresponds to multiple modalities in the space of attributes, thus leading to multiple support devices corresponding to this type of device.

There can also be significant scale challenges in maintaining the database of DDE module 604. In one embodiment, DDE module 604 can store this estimate in a distributed database where the space of devices is partitioned into large, rough subsets that are usually referred to as 'shard,' and the actual density estimates for each shard are maintained by independent nodes.

Another potential component of rule conflict resolution process 249 is distributed rule process (DRP) module 606 whose role is to use distributed computing systems (e.g., Apache Spark or the like), to evaluate the rules in URD 602 on the set of support devices defined by DDE module 604. Now, if a given support device matches multiple rules, one may assume that both rules overlap in practice. This overlap is not only qualitative: depending on the density at each point, DRP module 606 may also compute the probability that a conflict arises due to this overlap. Now, an overlap is not a problem in and of itself, if both rules have the same, or a similar, label L. However, if two overlapping rules assign different labels, then a conflict arises, which need to be resolved accordingly. Effectively, DRP module 606 assigns the label of any matching rule from URD 602 to the support devices defined by DDE module 604, and the conflict resolution is the responsibility of the next component, conflict resolution engine 608.

According to various embodiments, rule conflict resolution process 249 may also include conflict resolution engine 608, which assesses all support devices from DDE module 604 that have been identified by DRP module 606 as having more than one label assigned to them. Multiple scenarios are possible in this case, such as any or all of the following:

These labels are not related in any way—For example, the labels may indicate different manufacturers, makes, models, etc. (e.g., one label indicates "Apple—iPhone 8" and the other label indicates "Samsung—Magnetom Sola 1.5T," which is a type of MRI machine).

These labels are hierarchically organized—Here, the labels may share at least one common characteristic, such as the manufacturer or the like, and one may be a more specific label than that of the other. For example, one label may indicate "Apple—Phone" and the other label may indicate "Apple—iPhone 8."

These labels are analogs of each other—Given the vast number of device classification rules in URD 602, as well as their disparate sources, it is extremely likely that at least some of the labels will be different representations of the same underlying device type. For example, one label may be "Apple—MacBook Pro" and another may be "Apple—Mac Book Pro," which both refer the to same underlying device type.

Conflict resolution engine 608 may use different heuristics to identify the above conflict scenarios and resolve them, accordingly. To do so, a first step of conflict resolution engine 608 may be to compute an estimate the reliability $R_S$ of each rule source S by using the proportion of rules leading to conflict as a proxy. The greater the number of conflicting rules that a source S has, the lower its reliability. However, note that the indicator of confidence $C_R$ of rule R should be accounted for in this estimation, such that a source is less penalized by rules that were assigned low confidence. Consequently, every support device is now associated to a set of labels, each corresponding to a rule R with a score given by the product of $R_S*C_R$ where S is the source of R. As a result, conflict resolution engine 608 can resolve the conflicts by selecting the label with the largest cumulative score. For example, if two rules with a score of 0.25 assign the label "Apple—iPhone 8" and a third rule with a score of 0.15 assigns the label "Samsung—Magnetom Sola 1.5T," conflict resolution engine 608 may generate a rule conflict resolution 616 that assigns the former label to a device.

If the confidence scores are not telling, conflict resolution engine 608 may inspect the rules in further detail. For example, when one rule R1 is a refinement of another rule R2 such that the conditions of R1 are a superset of those of R2, or there is a large overlap between the two sets, this may suggest a hierarchical relationship among them, especially if their labels match the same manufacturer or hardware. For example, conflict resolution engine 608 may identify rules that have labels "Apple—iPhone 8" and "Apple—iPhone," respectively, as having such a hierarchical relationship. In such cases, conflict resolution engine 608 may identify this relationship and, if both rules have the same or similar reliabilities, it may keep both rules in URD 602 and register their hierarchical dependence. Thus, conflict resolution 616 may favor the more precise rule, when appropriate.

In other cases, the information in the labels could be not enough for conflict resolution engine 608 to determine whether a given rule is a refinement of the other. In such a case, conflict resolution engine 608 might trigger a crowdsourcing request, to resolve the conflict. To this end, a web interface may be available to human operators via any number of UIs, to review and resolve conflicts. If the distance (e.g., Levenshtein distance) between labels is small, conflict resolution engine 608 may submit the request to a generalist crowdsourcing service, such as Amazon Mechanical Turk, in order to confirm that the labels are simply misspellings and/or synonyms of each other. Otherwise, conflict resolution engine 608 may rely on a specialized panel of domain experts, to determine the rule to be selected.

A final component of rule conflict resolution process 249 may be source evaluation module 610, which is responsible for evaluating the different sources of rules, including active labeling, as described above. In particular, SEM 610 may construct a "reliability map" for every rule, which evaluates the reliability of the source for various regions of the space. Indeed, it is known that some sources are highly reliable for IoT devices, but not as much for consumer devices. Another example of such localized changes in rule accuracy are sources relying on radio frequency (RF) or Power over Ethernet (PoE) fingerprints, which may be extremely reliable for some specific types of device, but not at all in some other regions of the space.

In its simplest embodiment, the reliability map $M_S(D)$ constructed by SEM 610 merely captures the likelihood that a region of the space, identified by its support device D, will be classified correctly by rules from source S. This can be performed using a classifier or other form of statistical model, in various embodiments. In more complex embodiments, SEM 610 constructs multiple such maps to capture other aspects, such as the likelihood that rules from source S are a refinement of others (e.g., because source S has more fine-grained rules in this region). The reliability maps constructed by SEM 610 can be used by conflict resolution engine 608 to perform better resolutions in case of conflicts, and the information about the sources can be provided to crowdsourcing experts as context to help them in making their decisions.

Figure 7:
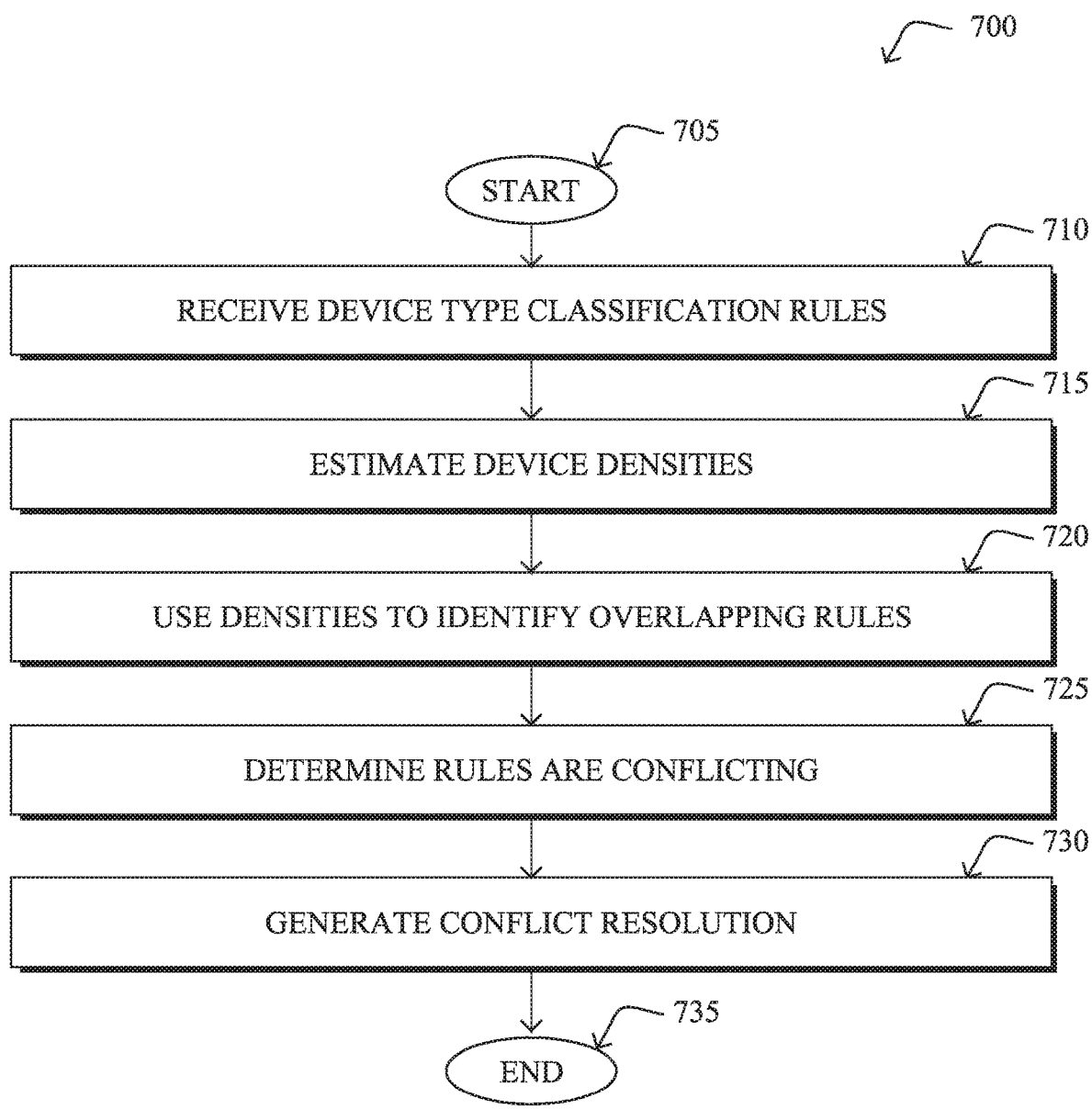
FIG. 7 illustrates an example simplified procedure for resolving device type classification rule conflicts.

FIG. 7 illustrates an example simplified procedure for resolving device type classification rule conflicts, in accordance with one or more embodiments described herein. For example, a non-generic, specifically configured device (e.g., device 200) may perform procedure 700 by executing stored instructions (e.g., process 249), to provide a service to one or more networks. The procedure 700 may start at step 705, and continues to step 710, where, as described in greater detail above, the service may receive a plurality of device type classification rules, each rule comprising a device type label and one or more device attributes used as criteria for application of the label to a device in a network. For example, the service may receive the rules from any number of device classification services across any number of networks. In general, the rules may specify device attributes that can be observed in the traffic of the devices such as their HTTP User Agents, DHCP information, destinations, temporal characteristics, and the like. Similarly, the device type labels may indicate the manufacturer, model, version, function, etc. of a device. For example, a given rule may specify that if the device exhibits attributes A, B, and C, then it is of a certain type.

At step 715, as detailed above, the service may estimate, across a space of the device attributes, device densities of devices having device attributes at different points in that space. More specifically, each attribute may correspond to a different dimension in an N-dimensional space and each device across the various network(s) may lie somewhere in this space, based on its own attributes. From this, the service can compute the probability densities of the various regions of this space. In some embodiments, the service may use this information to maintain a set of support points in the space of device attributes that represent specific classes of devices.

At step 720, the service may use the estimated device densities to identify two or more of the device type classification rules as having overlapping device attributes, as described in greater detail above. For example, if a support point from step 715 that correspond to a representative device in the attribute space (e.g., a point of high device density) has attributes that match those of multiple rules from step 710, the service may determine that those two or more rules overlap.

At step 725, as detailed above, the service may determine that the two or more overlapping device type classification rules are in conflict, based on the two or more rules having different device type labels. Indeed, if the labels of these rules do not match, the service may determine that they are in conflict with one another. In various embodiments, the service may also evaluate whether these rules are hierarchically organized, analogs of one another, or are completely unrelated.

At step 730, the service may generate a rule conflict resolution that comprises one of the device type labels from the conflicting two or more device type classification rules, as described in greater detail above. In some embodiments, the service may base this on reliability scores associated with the sources of the conflicting two or more rules based on a proportion of conflicting rules associated with that source. Such scores may be based on, for example, a proportion of conflicting rules associated with that source. In some embodiments, the service may then provide the resolution to one or more classification services for use. Procedure 700 then ends at step 735.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the identification of conflicting device type classification rules and the resolution of such conflicts.

While there have been shown and described illustrative embodiments that provide for the resolution of conflicting device type classification rules, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a service, a plurality of device type classification rules, each rule comprising a device type label and one or more device attributes used as criteria for application of the label to a device in a network;
   estimating, by the service and across a space of the device attributes, device densities of devices having device attributes at different points in that space;
   using, by the service, the estimated device densities to identify two or more of the device type classification rules as having overlapping device attributes;
   determining, by the service, that the two or more device type classification rules are in conflict, based on the two or more rules having device type labels that are different; and
   generating, by the service, a rule conflict resolution that comprises one of the device type labels from the conflicting two or more device type classification rules.

2. The method as in claim 1, wherein the device type labels are indicative of one or more of: a device manufacturer, a device model, or device version.

3. The method as in claim 1, wherein the service receives the plurality of device type classification rules from a plurality of device classification services located in different networks.

4. The method as in claim 1, further comprising:
   assigning a reliability score to each source of the conflicting two or more rules based on a proportion of conflicting rules associated with that source; and
   selecting one of the device type labels for inclusion in the rule conflict resolution based in part on the reliability scores associated with the sources of the conflicting two or more rules.

5. The method as in claim 1, wherein determining that the two or more device type classification rules are in conflict, based on the two or more rules having device type labels that are different, comprises:
   determining whether the device type labels of the two or more are hierarchically organized.

6. The method as in claim 1, wherein determining that the two or more device type classification rules are in conflict, based on the two or more rules having device type labels that are different, comprises:
   determining whether the device type labels are analogs of one another.

7. The method as in claim 1, wherein estimating, by the service and across the space of device attributes, device densities of devices having device attributes at different points in that space comprises:
   maintaining a set of support points in the space of device attributes that represent specific classes of devices.

8. The method as in claim 1, wherein generating, by the service, the rule conflict resolution that comprises one of the device type labels from the conflicting two or more device type classification rules comprises:
   determining that the service cannot resolve the conflicting two or more device type classification rules; and
   obtaining rule conflict resolution input from one or more user interfaces regarding the conflicting two or more rules.

9. An apparatus, comprising:
   one or more network interfaces to communicate with one or more networks;
   a processor coupled to the network interfaces and configured to execute one or more processes; and
   a memory configured to store a process executable by the processor, the process when executed configured to:
      receive a plurality of device type classification rules, each rule comprising a device type label and one or more device attributes used as criteria for application of the label to a device in a network;
      estimate, across a space of the device attributes, device densities of devices having device attributes at different points in that space;
      use the estimated device densities to identify two or more of the device type classification rules as having overlapping device attributes;
      determine that the two or more device type classification rules are in conflict, based on the two or more rules having device type labels that are different; and
      generate a rule conflict resolution that comprises one of the device type labels from the conflicting two or more device type classification rules.

10. The apparatus as in claim 9, wherein the device type labels are indicative of one or more of: a device manufacturer, a device model, or device version.

11. The apparatus as in claim 9, wherein the apparatus receives the plurality of device type classification rules from a plurality of device classification services located in different networks.

12. The apparatus as in claim 9, wherein the process when executed is further configured to:
    assign a reliability score to each source of the conflicting two or more rules based on a proportion of conflicting rules associated with that source; and
    select one of the device type labels for inclusion in the rule conflict resolution based in part on the reliability scores associated with the sources of the conflicting two or more rules.

13. The apparatus as in claim 9, wherein the apparatus determines that the two or more device type classification rules are in conflict, based on the two or more rules having device type labels that are different, by:
    determining whether the device type labels of the two or more are hierarchically organized.

14. The apparatus as in claim 9, wherein the apparatus determines that the two or more device type classification rules are in conflict, based on the two or more rules having device type labels that are different, by:
    determining whether the device type labels are analogs of one another.

15. The apparatus as in claim 9, wherein the apparatus estimates, across the space of device attributes, device densities of devices having device attributes at different points in that space comprises:
    maintaining a set of support points in the space of device attributes that represent specific classes of devices.

16. The apparatus as in claim 9, wherein the apparatus generates the rule conflict resolution that comprises one of the device type labels from the conflicting two or more device type classification rules by:
    determining that the apparatus cannot resolve the conflicting two or more device type classification rules; and
    obtaining rule conflict resolution input from one or more user interfaces regarding the conflicting two or more rules.

17. A tangible, non-transitory, computer-readable medium storing program instructions that cause a service to execute a process comprising:
    receiving, at the service, a plurality of device type classification rules, each rule comprising a device type label and one or more device attributes used as criteria for application of the label to a device in a network;
    estimating, by the service and across a space of the device attributes, device densities of devices having device attributes at different points in that space;
    using, by the service, the estimated device densities to identify two or more of the device type classification rules as having overlapping device attributes;
    determining, by the service, that the two or more device type classification rules are in conflict, based on the two or more rules having device type labels that are different; and
    generating, by the service, a rule conflict resolution that comprises one of the device type labels from the conflicting two or more device type classification rules.

18. The computer-readable medium as in claim 17, wherein the device type labels are indicative of one or more of: a device manufacturer, a device model, or device version.

19. The computer-readable medium as in claim 17, wherein the process further comprises:
    assigning a reliability score to each source of the conflicting two or more rules based on a proportion of conflicting rules associated with that source; and
    selecting one of the device type labels for inclusion in the rule conflict resolution based in part on the reliability scores associated with the sources of the conflicting two or more rules.

20. The computer-readable medium as in claim 17, wherein determining that the two or more device type classification rules are in conflict, based on the two or more rules having device type labels that are different, comprises:
    determining whether the device type labels of the two or more are hierarchically organized.

* * * * *